US008723652B2

(12) United States Patent
Delaney et al.

(10) Patent No.: US 8,723,652 B2
(45) Date of Patent: May 13, 2014

(54) CHIP RECOGNITION AND ACCOUNTING SYSTEM

(75) Inventors: James T. Delaney, Atlantic City, NJ (US); David Bakalian, Atlantic City, NJ (US)

(73) Assignee: South Montgomery Solutions, LLC, Atlantic City, NJ (US)

( * ) Notice: Subject to any disclaimer, the term of this patent is extended or adjusted under 35 U.S.C. 154(b) by 191 days.

(21) Appl. No.: 13/365,813

(22) Filed: Feb. 3, 2012

(65) Prior Publication Data

US 2012/0208622 A1 Aug. 16, 2012

Related U.S. Application Data

(60) Provisional application No. 61/442,322, filed on Feb. 14, 2011.

(51) Int. Cl.
*H04Q 5/22* (2006.01)

(52) U.S. Cl.
USPC .......................................................... 340/10.42

(58) Field of Classification Search
USPC ............................ 340/10.42, 5.9; 463/29, 47
See application file for complete search history.

(56) References Cited

U.S. PATENT DOCUMENTS

| | | | | |
|---|---|---|---|---|
| 7,491,125 | B2 * | 2/2009 | Mathis et al. | 463/47 |
| 2006/0084502 | A1 * | 4/2006 | Downs et al. | 463/29 |

* cited by examiner

*Primary Examiner* — Vernal Brown
(74) *Attorney, Agent, or Firm* — Volpe and Koenig, P.C.

(57) ABSTRACT

A device and method for casino chip recognition and accounting. The device includes a box having a slot in which chips can be deposited. The slot is connected to a chute which has a window through which a surface of the chip can be seen as it travels along the slot. A chip recognition device which can be a camera is arranged in a position to observe or detect the chip as it travels past the window, and is connected to a controller which utilizes recognition software programmed to compare the chip that it has detected with known chip images or data stored in memory to determine the chip denomination. The controller then signals a central computer the amount received. The system is useable for tracking and accounting for tips at casino table games. It can also be used for cashing in chips as well as detecting counterfeits.

12 Claims, 7 Drawing Sheets

CHIP RECOGNITION AND ACCOUNTING SYSTEM

FIELD OF INVENTION

The present invention is directed to a device and method for chip recognition as well as tracking and accounting for tips or "tokes" at casino table games.

BACKGROUND

It is known in the casino industry to tip or "toke" dealers at table games, such as Blackjack, Roulette, Baccarat, etc. Typically, these tips or tokes are placed through the slot located in the top of a locked tip box affixed to the gaming table. These locked tip boxes are periodically collected, typically at the end of a shift and are then emptied onto a single gaming table and counted by four or five dealers that worked that shift. The counted chips are then taken to the cashier's cage where the count is validated and the chips are exchanged for cash which is distributed amongst the dealers who worked that shift, typically with the counters getting an extra payment for participating in the count.

This system has drawbacks in that it takes additional time at the end of the shift for the dealers to count and divide the tips as well as extra time for the counting personnel in the cage to verify and track the tips that are collected so that they can be paid. This can result in some inaccuracy in the counts, and/or poor tracking for the purposes of accounting of employee tips for tax purposes. Additionally, the gaming chips placed in the tip box are lost from circulation during the period in which the gaming tables are operating, which ultimately requires more frequent refurbishment of chips at the gaming tables which takes away from playing time as well as requires extra personnel to replenish chips at each table at various times during a gaming shift.

It would be desirable to provide a system and method for improving the tracking and payment of tips or tokes to dealers. It would also be desirable to provide the ability to track specific tips by table or dealer I.D.

SUMMARY

A device and method for tracking and accounting for tips or tokes at casino table games is provided. The device includes a tip box having a slot in which chips received as tips can be deposited. The slot is connected to a chute which has a window through which one or both surfaces of the chip can be seen as it travels along the chute. A chip recognition camera is arranged in a position to observe the chip as it travels past the window and is connected to a controller which utilizes recognition software programmed to compare the chip that it has imaged with known chip images stored in memory in order to determine the denomination of the chip. The controller then signals a tallying system with the amount received as well as optionally one or more of the following: a dealer I.D., a table I.D., a shift, a time and date of the tip. The chip then continues down the chute to a discharge tray where it can be recycled back into the chip rack since it has been counted.

The tip box can be used in any table game location.

Additionally, it is possible to use an RF ID reader in connection with an RF ID tag embedded in the chips in place of the camera imaging the chips in order to recognize the chip denomination.

In the method according to the invention, a tip box is provided which includes a tip recognition device. A tip is placed in the tip box and the chip recognition device identifies the denomination of the chip and signals a tip amount and preferably at least one or more of a dealer I.D., table I.D., shift, time and date to a system controller which tracks tips to a dealer account or to a shift account. If a dealer account is utilized, the amount of the dealer tips at the end of a shift is transmitted to payroll and included in dealer pay or transmitted to a manager to provide the cash tip to the dealer at the end of the shift. The data can then be passed to the casino accounting system for various tracking purposes, such as employee taxes, table game utilization, dealer performance, etc. In the event that a shift account is utilized, the total tips from all of the table games in action during a shift are added, and the total is divided by the number of dealers and either distributed or transmitted to payroll. The division can be based on the shift and/or can be weighted based on actual shift hours worked in the event that less than a full shift is worked by one or more dealers. As in the dealer account system, the data is transmitted to payroll to be included in dealer pay or transmitted to a manager to provide cash tips at the end of the shift. Additionally, the data can be used to update various other systems, such as accounting and performance tracking within a casino.

In another aspect, the tip box can be utilized as a stand alone chip recognition system that is connected to a cash dispensing device. Any casino patron could then place chips in the slot on the box and the chip is identified. Instead of the chip being returned via a chip discharge tray, the chips would be collected in a locked container. Once a user had deposited his chips, they would be totaled and the cash dispenser would dispense the corresponding cash. This would eliminate some demand at the cash cages in casinos for exchanging chips for cash.

Additionally, the chip recognition system could be used for tracking table rakes and/or bad beat jackpots at poker tables by passing the rake through the chip recognition system and tracking and subtracting the rake (or house cut) from each pot as well as a bad beat jackpot if the table provides this option to protect high hand bad beat losses.

BRIEF DESCRIPTION OF THE DRAWINGS

The foregoing summary as well as the following detailed description will be better understood when read in conjunction with the appended drawings. In the drawings.

DETAILED DESCRIPTION OF THE PREFERRED EMBODIMENTS

Figure 1:
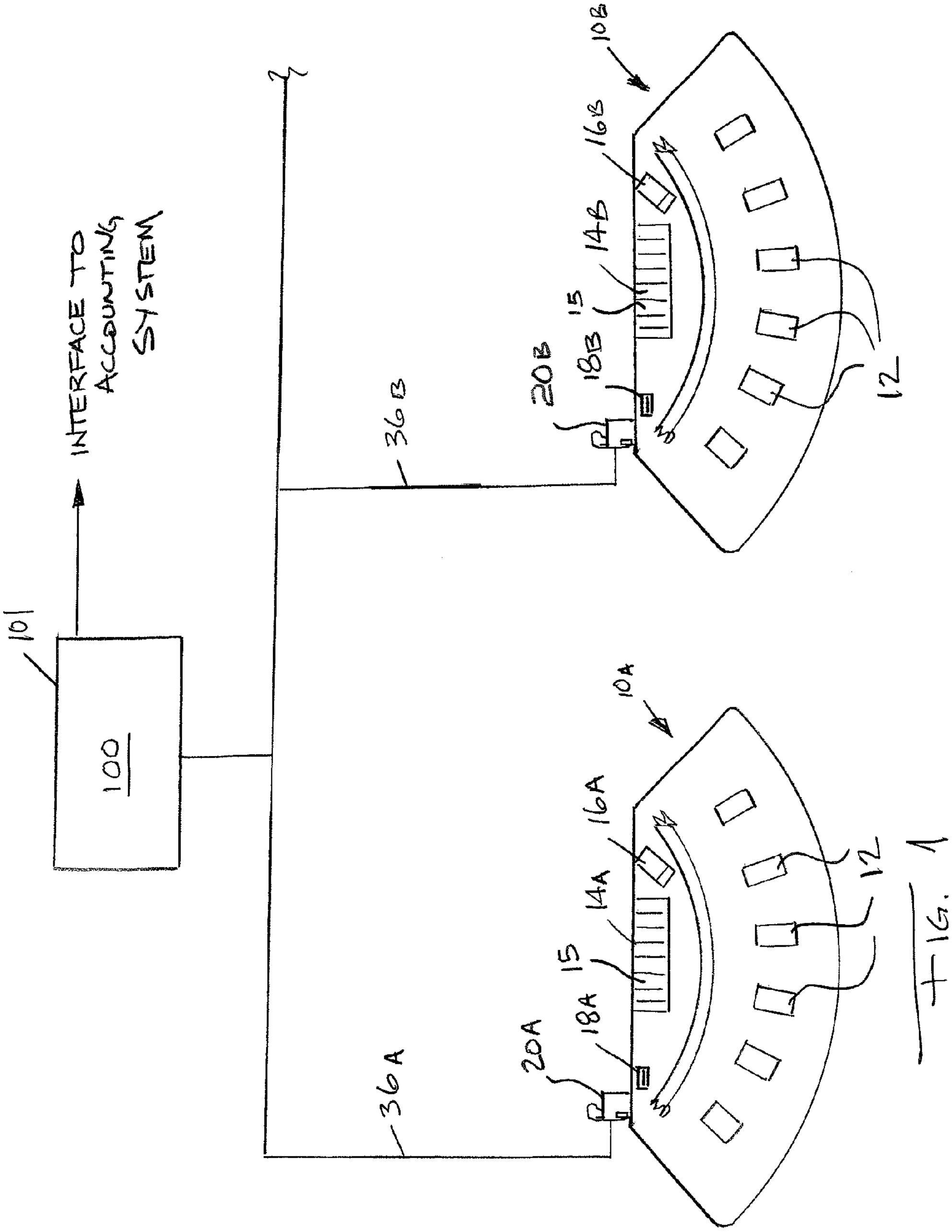
FIG. 1 is a schematic view of a portion of a casino floor in which the tip or toke tallying system in accordance with the invention is utilized.

Certain terminology is used in the following description for convenience only and is not limiting. The words "right", "left", "top", and "bottom" designate directions in the drawings to which reference is made. The words "a" and "one" are defined as including one or more of the referenced item unless specifically stated otherwise. This terminology includes the words noted specifically above as well as derivatives thereof and words of similar import.

Referring to FIG. 1, a tallying system 100 for tip or toke tallying is shown. The system 100 is illustrated in connection with Blackjack tables 10A, 10B, but can be used with other types of table games on a casino floor. The Blackjack tables 10A, 10B include betting areas 12, chip racks 14A, 14B in which the chips 15 are located as well as a money slot 18A, 18B in which money from patrons is placed when the patrons purchase chips for gambling. In place of the typical lock box generally used for collecting tips in the casino industry, a tip box 20A, 20B according to the invention is provided at each of the table games 10A, 10B in the casino. While two table games have been illustrated, those skilled in the art will recognize that the system would be applicable for various other table games such as Roulette, Baccarat, Poker, etc.

The tip boxes 20A, 20B are connected either via hard wires 36A, 36B or via wireless connections to the tallying system computer 101 which is a programmable computer that utilizes a programmable media with software designed to account for the tips placed in the tip boxes 20A, 20B and tracks the tips based on various parameters, such as table I.D., dealer I.D., shift, time, date, etc.

Referring to FIGS. 2-10, a preferred embodiment of the tip box 20 is shown. The tip box 20 illustrated is the same as the tip boxes 20A, 20B identified above that are connected to the gaming tables 10A, 10B, but is identified generally as 20.

Figure 2:
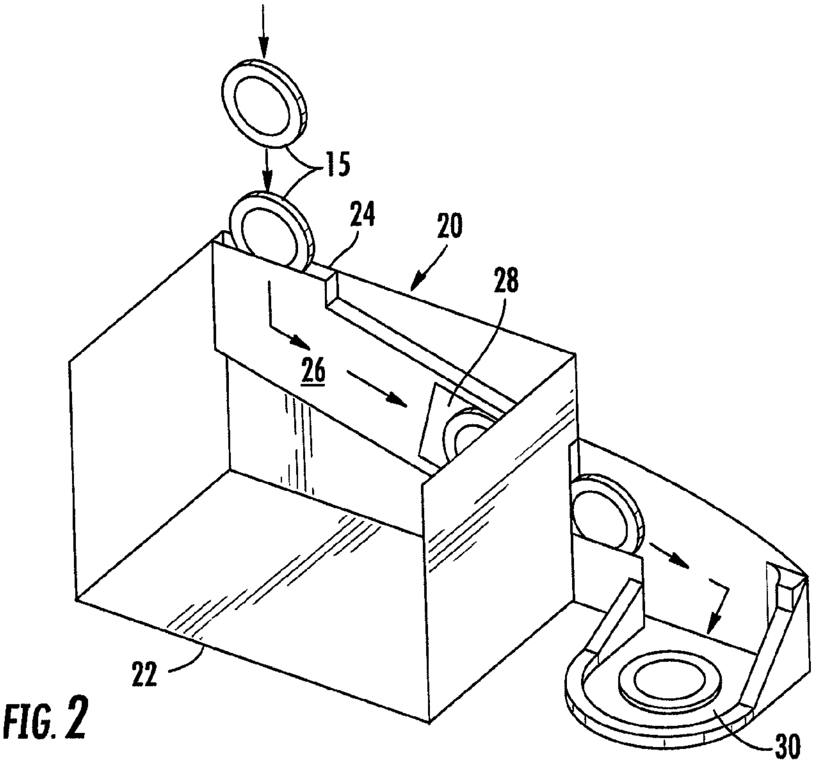
FIG. 2 is a perspective view of a tip box in accordance with the invention, with the tip box being partially broken away in order to show the internal chute and window used for guiding the chip through the tip box.
Figure 3:
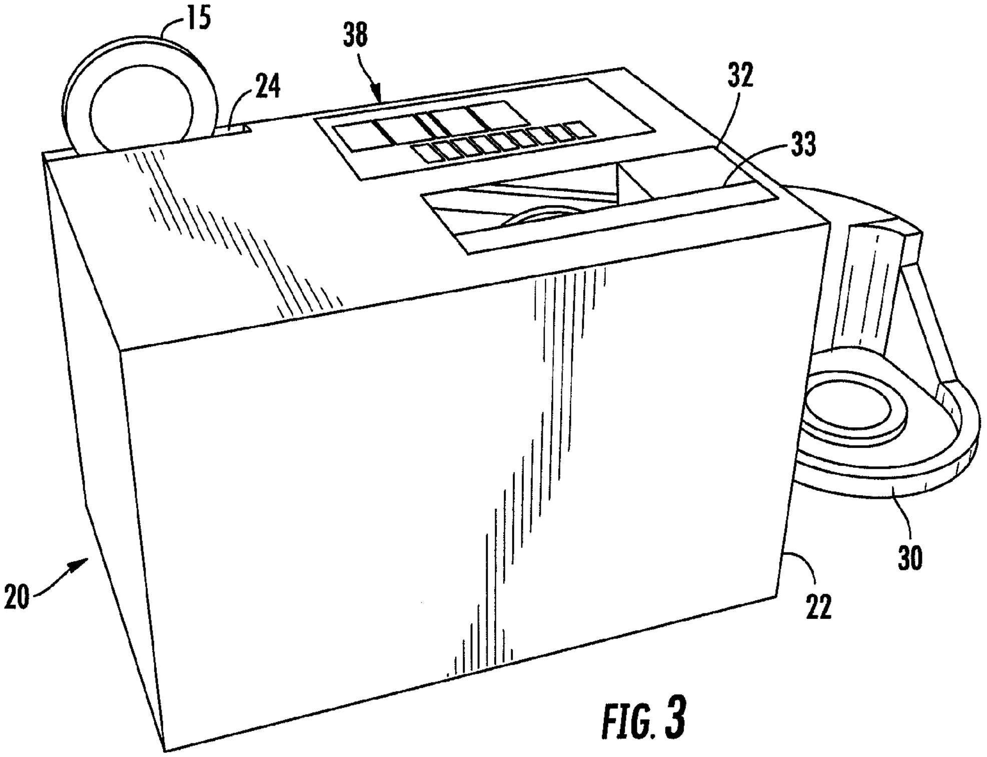
FIG. 3 is a perspective view of the chip box according to the invention illustrating the receiving slot for the chip recognition camera and controller.

As shown in FIGS. 2 and 3, the tip box 20 has a housing 22 with a slot 24 located at a top surface thereof. The slot 24 is adapted to receive a gaming chip 15. The slot 24 is connected to a chute 26 that is adapted to receive a single chip at a time and thus has a width and height that is adapted to be slightly greater, respectively, than the thickness and diameter of a chip 15. The chute 26 and the housing 22 are preferably formed of a polymeric material although they can be formed from metal or wood, or combinations of materials can be utilized.

Figure 4:
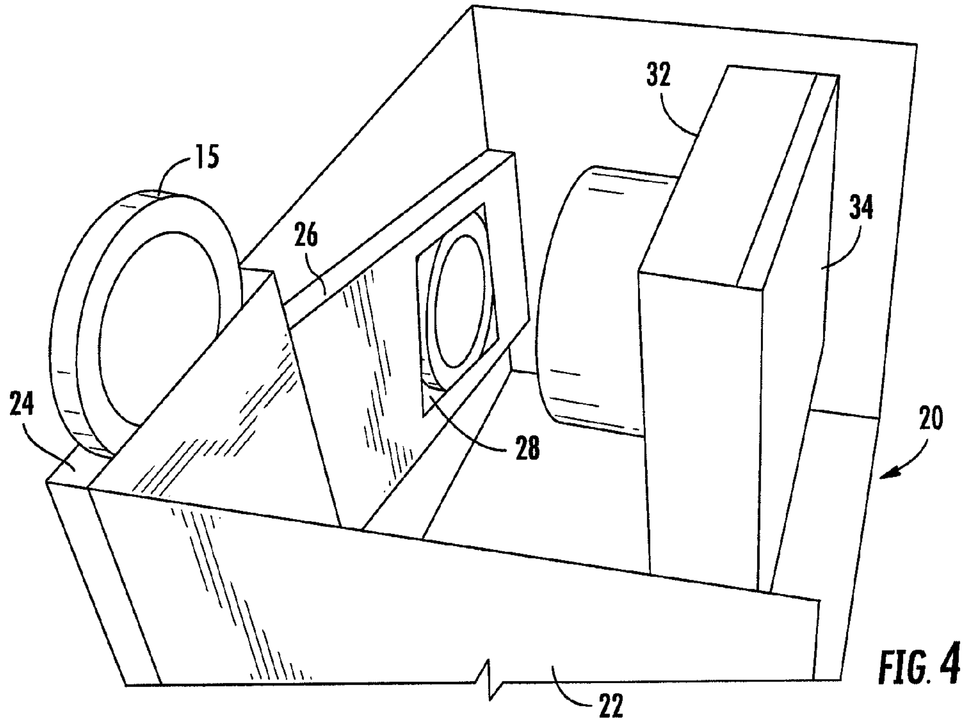
FIG. 4 is a perspective view with a top and front of the tip box being removed to show the chip recognition device and controller within the tip box.
Figure 5:
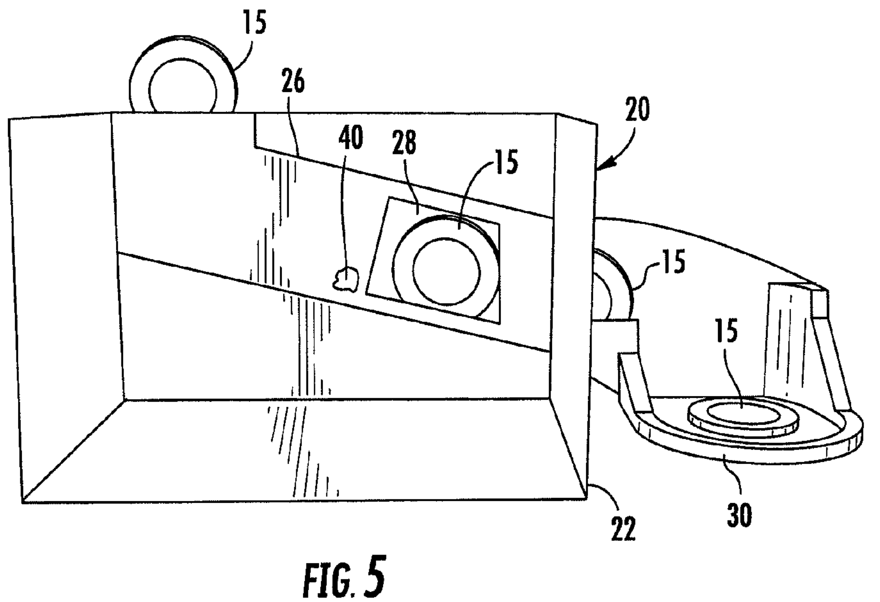
FIG. 5 is a front elevational view of the tip box with the front removed showing the chip passing in front of a window in the chute.
Figure 6:
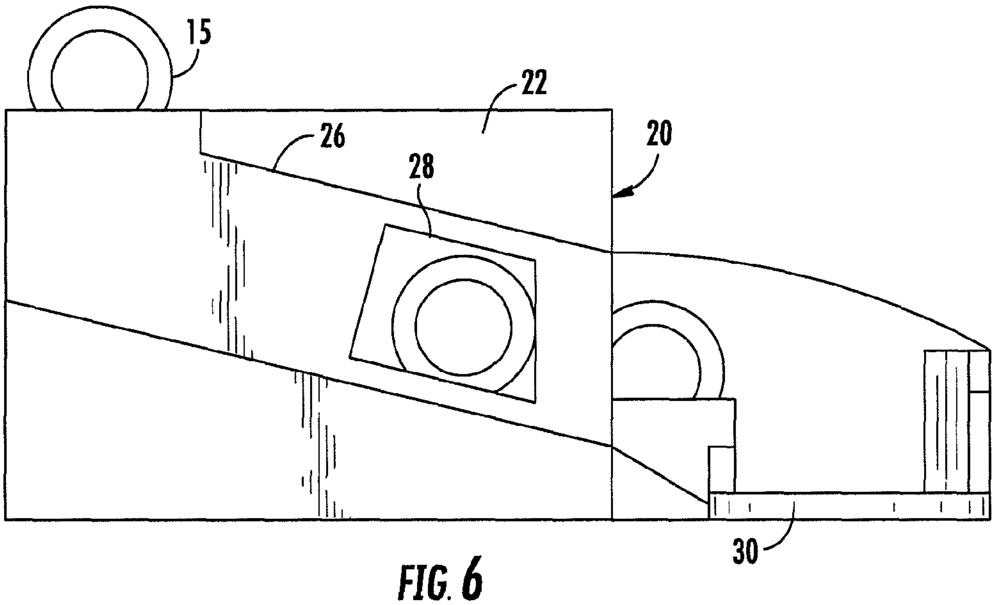
FIG. 6 is a front elevational view, partially broken away, showing preferred dimensions for one embodiment of the chip box according to the invention.
Figure 7:
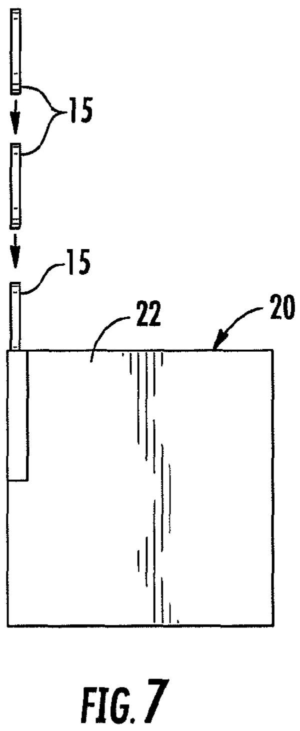
FIG. 7 is a left side elevational view showing preferred dimensions of one embodiment of the tip box.
Figure 8:
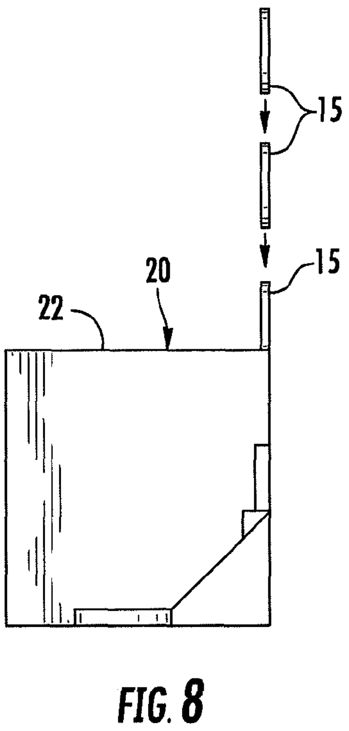
FIG. 8 is a right side elevational view showing preferred dimensions of one embodiment of the tip box.
Figure 9:
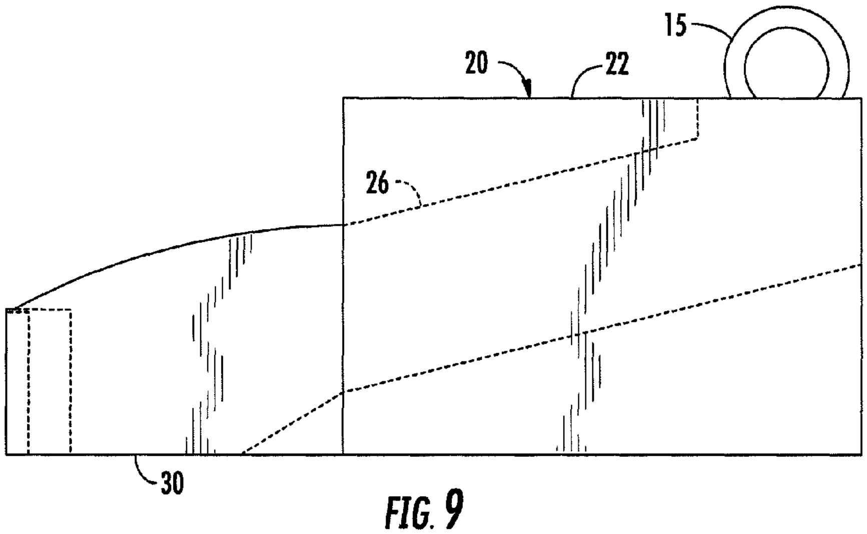
FIG. 9 is a rear elevational view showing preferred dimensions for one embodiment of the tip box.
Figure 10:
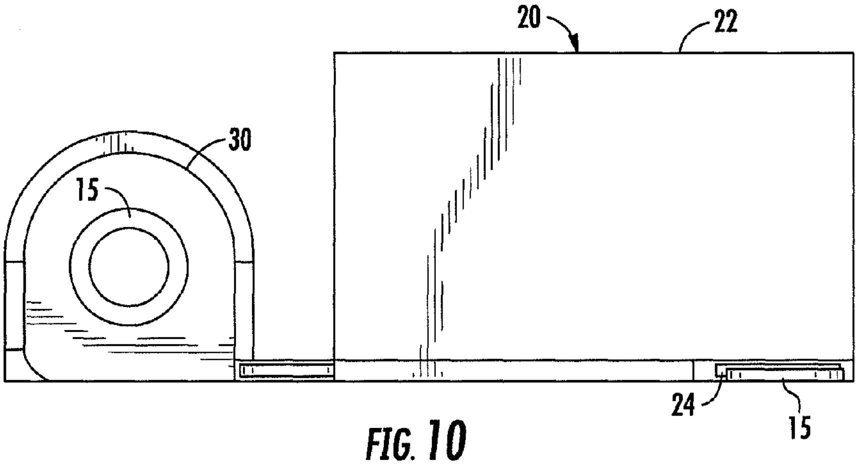
FIG. 10 is a top plan view showing preferred dimensions for one embodiment of the tip box.

As shown in detail in FIGS. 2, 4, and 5, a window 28 is located in the chute which exposes a major surface of the chip 15 as it slides down the chute 26. After passing by the window 28, the chute extends out to a discharge tray 30 where the chip is deposited after passing through the chute.

As shown in FIG. 4, a chip recognition device 32 is provided facing the window, or optionally two recognition device to face both sides of the chip can be provided, such as imaging devices. The chip recognition device is preferably a chip recognition camera which can be a CCD camera, such as an iVu TG camera, and can either be activated via a sensor 40 (shown in FIG. 5) located along the chute 26 or can be continuously on. The sensor 40 is preferably a break-beam sensor that determines the presence of the chip 15, although various other sensors could be used. While a chip recognition device 32 using a camera is preferably provided, it is also possible to use an RFID sensor. The chip recognition device 32 is connected to a microcomputer/controller 34 which is programmed to determine the denomination of the chip by comparing the image provided by the chip recognition camera to known images for chips of various denominations stored in the memory of the microcomputer/controller 34. For RFID identification, the RFID code of the chip detected by the RFID sensor would be compared to known codes stored in the memory of the microcomputer/controller 34. The chip 15 travels down the chute and can be stopped in front of the imaging devices or travels uninterrupted so it does not stop until it is deposited in the discharge tray 30. Preferably, a control panel 38 on top of the tip box 20 includes an indicator light that blinks green if the chip has been properly recognized or blinks red if the chip is not recognized and must be retrieved from the discharge tray 30 and inspected and/or reinserted in the slot 24, preferably by a pit boss, to be properly counted. If the chip 15 is recognized, it can be returned to the chip rack 14 on the table 10A, 10B, etc. Other types or arrangements of indicators can be used.

Once the denomination of the chip 15 is recognized by the controller 34, it generates a signal which is sent via wires 36 or wirelessly to the tallying system 100. Here, the system 100 which is preferably operating on a computer 101 with programmable software stored on a computer readable medium in the computer 101, can track the amount of tips and/or various other parameters, as discussed in further detail below.

Figure 11:
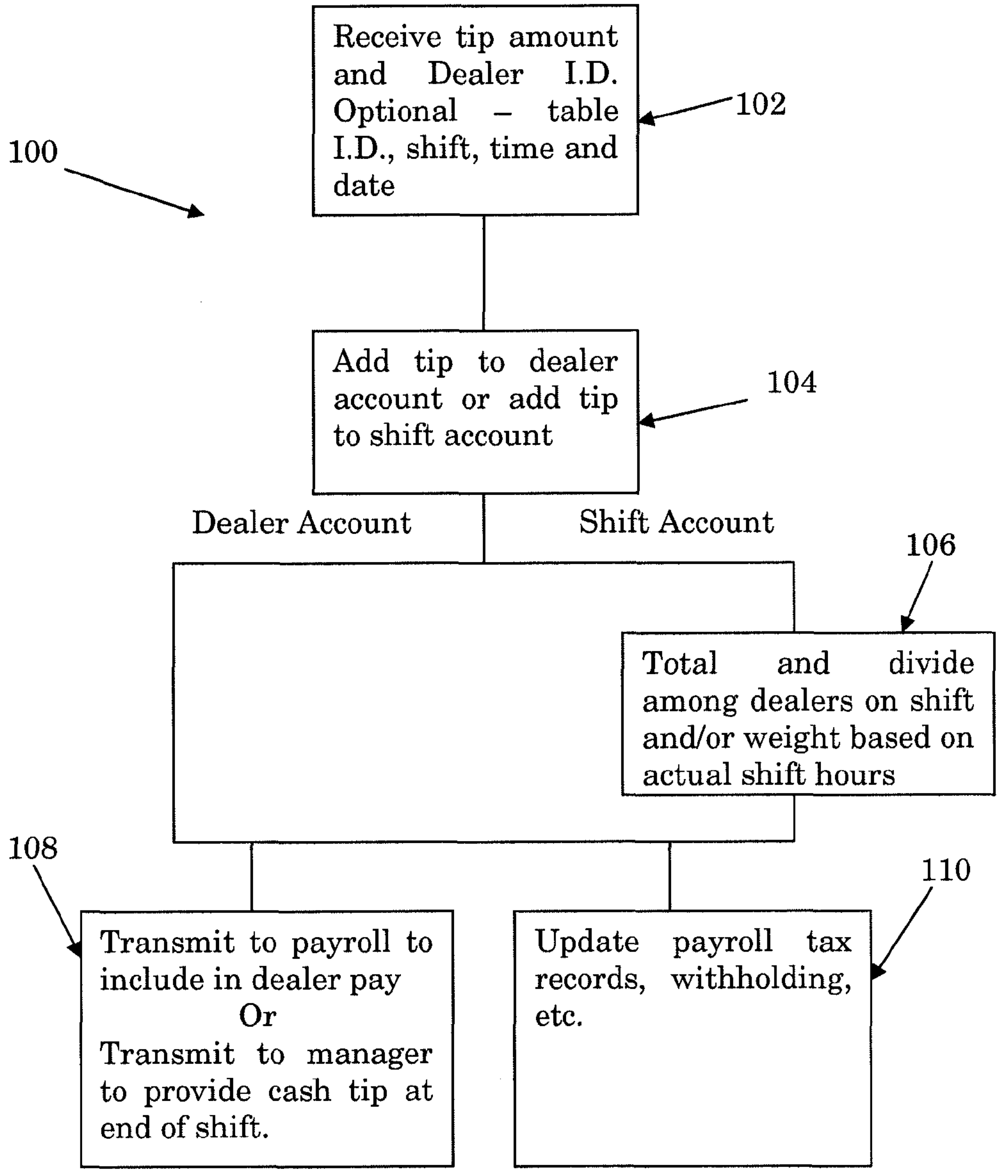
FIG. 11 is a flow chart showing operation of the tip or toke tallying system according to the invention.
Figure 12:
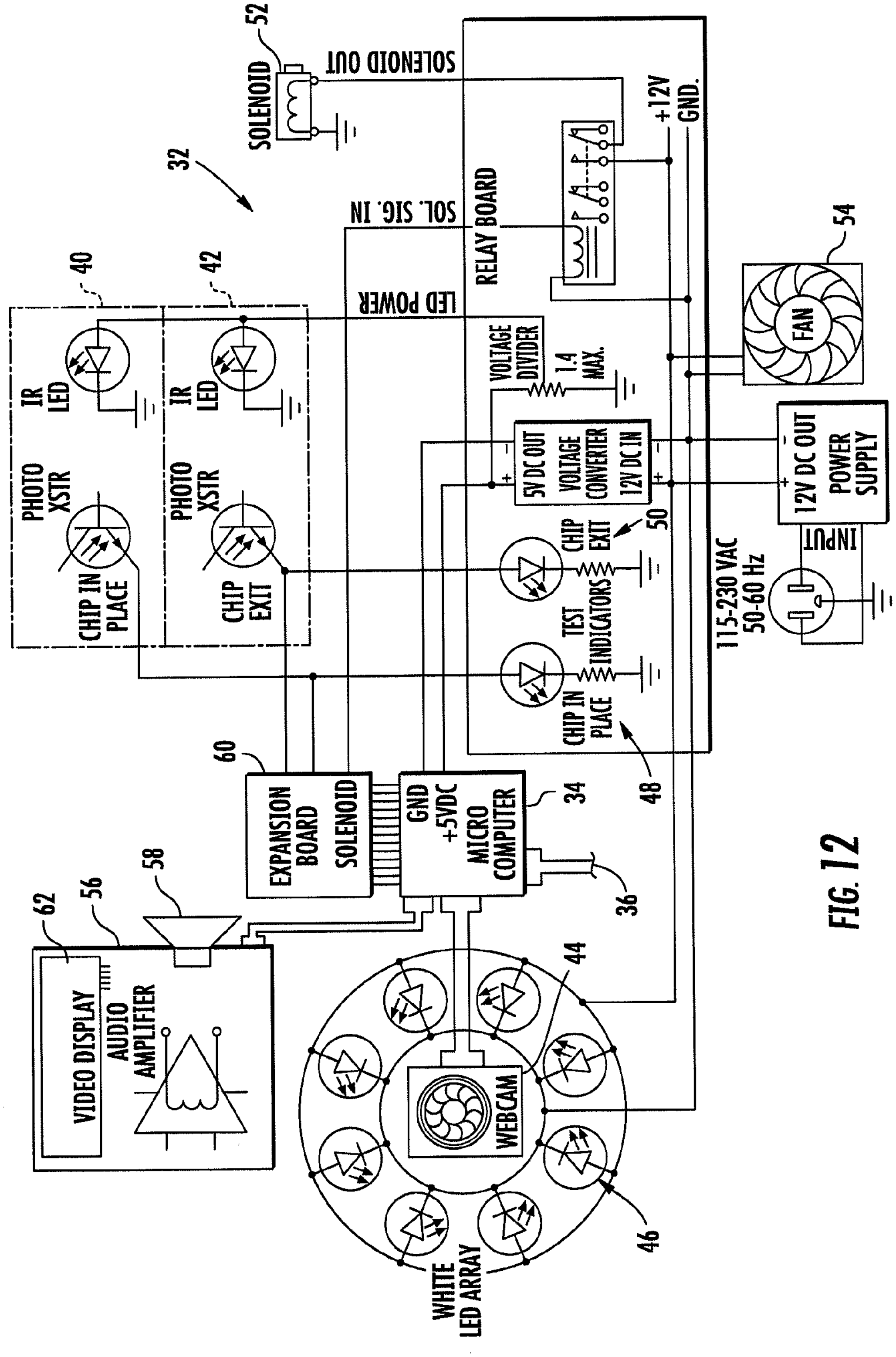
FIG. 12 is a circuit diagram showing a preferred arrangement of a chip recognition device.

Referring to FIG. 11, a circuit diagram for one preferred embodiment of a chip recognition device 32 is shown. The chip recognition device 32 includes the microcomputer/controller 34 that preferably has an output 36 to the main system computer 101. The microcomputer/controller 34 is connected, preferably via an expansion board 60, to a solenoid 52 that intersects the chute 26 to hold a chip in a predetermined position in the chute 26 in front of the window 28 for imaging on at least one side via a camera 44. Preferably a light source is providing for illuminating the surface of the chip being imaged, which is indicated as a white LED array 46. Although only one camera 44 for imaging one surface of a chip is shown, it will be recognized that more than one camera could be provided to image both surfaces, using windows on both sides of the chute 26, as well as possibly imaging an edge of the chip. Two sensors 40, 42, each preferably being in the form of an LED-phototransistor pair, are provided to detect a chip being in position for imaging as well as exiting the chute 26 after imaging. Different types of sensors could be utilized, as would be apparent to the person skilled in the art. Indicator lights 48, 50 are preferably provided in conjunction with the sensors 40, 42, respectively. In this embodiment, the first indicator light 48 indicates when a chip is in place, and the second indicator light 50 indicates when the chip exits the chip recognition device 32. An output board can also be connected to the microcomputer/controller 34 with an audio output 58 as well as a visual display, such as the LED display 62 that can display various data or a count of the chips recognized, or provide an alert if the chip is not recognized.

It would also be possible to provide a solenoid to regulate the flow of chips to the window 28 in the chute 26. Further, an additional solenoid could be provided after the window 28 for dividing the exit paths of chips from the chip recognition device 32 such that chips that are recognized are discharged at the discharge tray 30, while any chips that are not recognized are diverted to a separate discharge tray for re-scanning or further analysis.

Referring to FIGS. 6-10, dimensions are shown in inches for one preferred embodiment of the tip box 20. These dimensions are intended to be only for exemplary purposes, and various other sizes can be utilized if desired. The housing 22 is adapted to fit in the tip box receiving area of standard gaming tables and thus is easily retrofitted into existing gaming tables.

Additionally, those skilled in the art will recognize that if an RFID reader is utilized that the window 28 may not be required. Alternatively, a combination of chip recognition devices 32 can be utilized so that not only is an image of the surface of the chip captured by a chip recognition camera, but also other anti-counterfeiting elements are checked and read, such as an embedded RFID device, edge markings or other known anti-theft measures.

The display 38 on top of the tip box 20 is preferably a LCD and can display the total tips collected during a shift or session and can have a keyboard which allows a dealer to input either an employee I.D. or the tip box 20 may include a sensor that allows a dealer's employee badge to be scanned or read so that the tallying system 100 recognizes the dealer working a particular gaming table during the times that tips are being tracked by the tallying system 100.

Referring to FIG. 11, the system 100 receives a signal from each tip box 20 with the tip amount and preferably at least one of the dealer I.D., table I.D., shift, time and date that tip is being counted by the tip box 20, as indicated in box 102. The tallying system 100, which is executed on a computer 101 with software that is stored on a computer readable medium adds each tip to a dealer account or to a shift account, depending upon the particular casino rules, as indicated in box 104. In some casinos, tips are split equally among dealers by shift. It is also possible using the system 100 according to the present invention to provide a more accurate tracking of dealers either via table, dealer I.D., actual time worked during a shift, etc., which is all easily tracked by the system 100. In the event that a shift accounting method is utilized, the tips for a particular shift are totaled and, once the shift is completed, the system divides the total amount of shifts among the dealers working the shift, as indicated in box 106. The system can use a weight based division and distribution based on actual shift to hours worked so that if a dealer only works half of an eight hour shift, they are given a half share of the total tips collected. The amounts are transmitted to payroll or to a manager for distribution as indicated in box 108. Alternatively, if dealer accounting is utilized, the system 100 tracks the tips by dealer and at the end of a shift transmits the total tips to the accounting system for payroll purposes to include in a dealer's pay or transmits the total by dealer to a manager to provide a cash tip to the dealer at the end of the shift, as indicated by box 108. The system 100 also provides data to update payroll tax records, tax withholding, etc. as indicated at box 110.

Data collected by the system 100 can also be used to evaluate dealer performance based on tips.

In a further development according to the invention, the tip box 20 can be a stand alone system located on the casino floor where the chute 28 no longer exits into a discharge tray that can be accessed by the user, but rather ends in a closed storage container. The tip box 20 here is associated with a cash dispenser, similar to an ATM, and casino patrons can place chips in the tip box 20 where they are counted and then use the controls on the display 38 to indicate when no further chips are being inserted. The system 100 then sends a signal to the associated cash dispenser so that the corresponding amount of cash is dispensed to the patron.

The chip recognition system can also be used at other gambling table side devices for tracking various other data in addition to the chip recognition function such as, for example, the house rake from a pot in a poker game, or tracking an additional rake for a bad beat pot for poker tables offering this type of protection for certain bad beat losses, which are subject to specific house rules on what types of hands can qualify for winning the pot. Various other tacking functions will also become apparent once the chip recognition system is instituted.

While the preferred embodiments of the invention have been described in detail, those skilled in the art will recognize that other variations and changes can be made that fall within the scope of the invention as defined by the appended claims.

What is claimed is:

1. A casino chip recognition and accounting system, comprising:

a microcomputer/controller having an associated a memory;

a chip identification detection device comprising a camera connected to the microcomputer;

a guide channel that is adapted to carry a casino chip along a path that passes by the chip identification detection device;

a sensor that signals the chip identification detection devices when a chip is in a position for detection of the chip identity;

a solenoid located along the guide channel that acts as a stop to hold the chip in the position for detection;

the guide channel includes a window at the position for detection and the camera is arranged to image an area within the window;

an output device connected to the microcomputer/controller that signals a result of the chip identification;

wherein the memory associated with the microcomputer/controller includes known chip image data for known chips; and the microcomputer/controller is configured to compare a scanned image of a chip in the guide channel against the known chip image data and determine an identification of a value of the chip being detected.

2. The system of claim 1, further comprising:

a housing encompassing the microcomputer/controller, the chip identification device and the guide channel, the housing having a receiving slot for insertion of the chip into the guide channel and a discharge tray located at an end of the guide channel.

3. The system of claim 2, further comprising:

a central computer adapted to receive output from the microcomputer/controllers associated with a plurality of the chip identification detection devices.

4. The system of claim 3, wherein the central computer is adapted to track a value of chips identified by the microcomputer/controllers associated with the plurality of the chip identification detection devices as well as one or more of a dealer I.D., a table I.D., a location I.D., a shift, a time or a date.

5. The system of claim 1, wherein a visual indicator for a status of a chip being detected is connected to the microcomputer/controller.

6. The system of claim 1, wherein an audio indicator for a status of a chip being detected is connected to the microcomputer/controller.

7. The system of claim 1, wherein the chip identification detection device and the microcomputer/controller are configured to check the chip for authenticity.

8. The system of claim 1, wherein the chip identification detection device comprises an RF ID reader, and the memory associated with the microcomputer/controller includes known RF ID data for known chips; and the microcomputer/controller is configured to compare data read from the RF ID tag in a chip in the guide channel against the known chip RF ID data and determine an identification of a value of the chip being detected.

9. A method of tracking and accounting for tips or tokes at casino table games, comprising:

providing a tip box having a slot in which chips received as tips can be deposited, the slot is connected to a guide chute which directs the chip to a chip identification detection device that is connected to a microcomputer/controller, the microcomputer/controller having a memory programmed with known chip identification data and the microcomputer being adapted to determine a denomination of the chip, the microcomputer/controller also being connected to a central computer adapted to receive output from the microcomputer/controllers associated with a plurality of the chip identification detection devices;

for each of the tip boxes at casino table games that have a dealer, transmitting at least one of a dealer or a table identification for the tip box to the central computer;

a dealer depositing chips received as tips into the slot;

the chip identification detection device signaling data associated with each of the chips received as tips to the microcomputer/controller;

the microcomputer/controller recognizing each of the chips received as tips and signaling a denomination of each of the chips received as tips to the central computer or the microcomputer/controller signaling if any of the chips is not recognizable; and immediately returning each of the chips that is recognized into play at the casino table games;

tracking the tips for each of the table games at the central computer.

10. The method of claim 9, further comprising:

allocating tips to each of the dealers based on data collected by the central computer.

11. The method of claim 10, further comprising:

tracking at least one of wage or tax data based on the tips using the central computer.

12. The method of claim 9, further comprising:

tracking at least one of a shift time and a time and date associated with each tip by the central computer.

* * * * *